INVENTOR
FREDERICK S. DELLENBAUGH JR
BY Elmer J. Gorn.
ATTORNEY

Patented Oct. 10, 1939

2,175,379

UNITED STATES PATENT OFFICE 2,175,379

REGULATING SYSTEM

Frederick S. Dellenbaugh, Jr., Chestnut Hill, Mass., assignor to Raytheon Manufacturing Company, Newton, Mass., a corporation of Delaware Application December 31, 1934, Serial No. 759,852
Renewed September 12, 1938

13 Claims. (Cl. 175—363)

This invention relates to regulating systems, and more particularly to voltage regulators which are designed to deliver a voltage to a rectifier which increases in value as the load delivered by the rectifier increases, so that the voltage across the load remains constant with variations in load.

An object of my invention is to produce such a voltage regulator whose regulating action quickly and accurately follows variations in the load.

Another object of my invention is to devise such a regulator which is stable in operation even when subjected to load surges.

An additional object is to arrange the regulator so that alternating and other transient disturbances are balanced out of the direct current output.

A still further object of my invention is to secure the desired voltage regulation with a minimum of material.

The foregoing and other objects of my invention will be best understood from the following description of exemplifications thereof, reference being had to the accompanying drawings, wherein.

Figure 1:
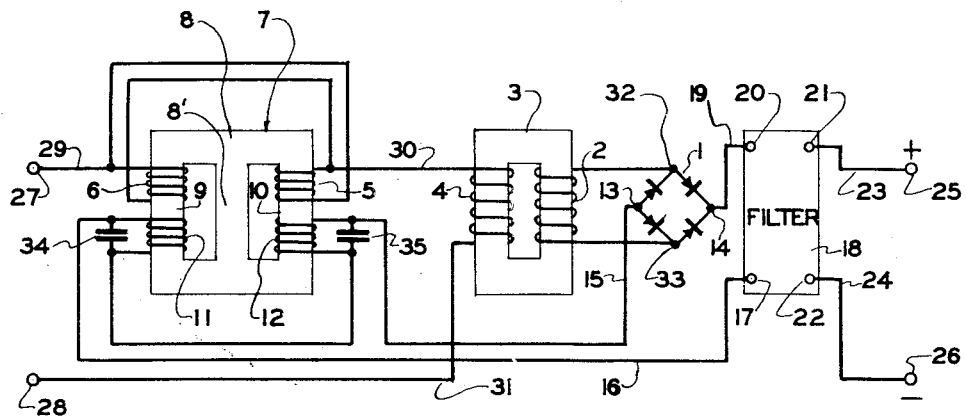
Fig. 1 is a diagrammatic representation of one form of my novel voltage regulator using a novel saturating reactor.

In a system for supplying direct current to a load from an alternating current source through a rectifier and filter, it is desirable to insert before the rectifier and filter some means for causing a rising voltage to be applied to the rectifier as the direct current load increases so that the voltage drops through the system may be compensated for and the voltage across the load maintained constant. Voltage regulators of this kind have been devised in which a reactor is placed in series with the A. C. line supplying the rectifier, which reactor is saturated by a coil fed from the output of said rectifier. In such systems a filter circuit is interposed between the rectifier and the load in order to supply smoothed direct current to the load. I have found that it is desirable to connect the direct current saturating coils in the output of the rectifier between the rectifier and the filter. This arrangement is advantageous because the magnetic characteristics of the saturating reactor produce a small amount of even harmonics of the supply line frequency in the saturating coil. By arranging the complete filter circuit so that it is placed between the saturating reactor and the load, then the full effectiveness of this filter circuit is available for suppressing any hum or ripple produced by these even harmonics. With such a connection the current supplied to the saturating coils consists of unidirectional pulsations, and I have found that such pulsations are entirely adequate for producing the desired saturating action. In such an arrangement it is desirable that the magnitude of the current through the saturating coils follow closely the variation in the magnitude of the load. As the current through the saturating coils consists of pulsating direct current, which may be considered as a straight uniform direct current with a superimposed alternating current, it is obvious that the impedance of the saturating coils must be considered from the standpoint of the superimposed alternating current. It is therefore desirable to reduce the impedance of the saturating coils with respect to the superimposed alternating current in the pulsating D. C. used for producing saturation, to as great a degree as possible. Furthermore, the reaction of the alternating current component in the saturating current with impedance of the saturating coils tends to make the system unstable, particularly when subjected to surges or sudden changes in the load. This instability manifests itself by "hunting" of the system, resulting in a periodic variation in the direct current voltage output. In previous voltage regulating systems it has also been difficult to prevent the alternating current coils of the reactor from inducing in the direct current saturating coils some alternating voltage. Attempts have been made to balance out the induced alternating voltages in the direct current coils, but complete balancing has been difficult. My present invention materially reduces each of the above difficulties in addition to possessing several additional novel features.

In Fig. 1 of the drawings I have illustrated a novel regulator system of the type discussed above. This system consists of a rectifier 1 fed from a secondary winding 2 of a transformer 3 whose primary winding 4 has in series therewith inductance coils 5 and 6 of a control reactor 7. The two coils 5 and 6 are preferably connected in parallel, as shown, although certain features of my invention may be utilized with such coils in series with each other. The rectifier 1 is illustrated diagrammatically as being a full-wave rectifying bridge. Any other rectifying arrangement could be used, such as, for example, a full-wave rectifying tube or tubes, or even a single wave rectifier. The reactor or choke 7 consists preferably of a three-legged core 8 having the coils 5 and 6 wound on the two outer legs 9 and 10 thereof. Two additional coils 11 and 12 are also wound on the legs 9 and 10, and are connected in series with each other. The core 8 is provided with a central leg 8'. The rectifier 1 has two output terminals 13 and 14. One of the output terminals, for example 13, is connected by a conductor 15 through the coils 12 and 11, and then by an additional conductor 16 to an input terminal 17 of a filter 18. The other output terminal 14 of the rectifier 1 is connected by a conductor 19 to the other input terminal 20 of the filter 18. The two output terminals 21 and 22 of the filter 18 are connected by conductors 23 and 24 to load terminals 25 and 26, respectively. The system may be provided with two input terminals 27 and 28 which are adapted to be connected to some suitable source of alternating current. One of the input terminals, for example terminal 27, is connected by means of a conductor 29 to the two coils 6 and 5 in parallel, and then by an additional conductor 30 to one end of the primary winding 4 of transformer 3. The other end of said primary winding 4 is connected by means of a conductor 31 to the other input terminal 28. The terminals of the secondary winding 2 of the transformer 3 are connected to the two input terminals 32 and 33 of the rectifier 1. In some cases where the action of a filter is not necessary, the filter may be omitted.

When an alternating voltage is applied to the input terminals 27 and 28 and a direct current load is drawn from the load terminals 25 and 26, current will flow through the various coils shown. The current so flowing will introduce voltage drops in these coils, in the rectifier 1, and in the filter 18 associated therewith. By passing the output of the rectifier 1 through the coils 11 and 12, this output current will tend to saturate the core 8 and thus reduce the impedance of coils 5 and 6. This reduction in the impedance of these coils will decrease the voltage drop introduced thereby, and will permit a larger portion of the impressed voltage to be impressed upon the primary 4. This causes the voltage across the secondary 2, which voltage is impressed upon the rectifier 1, to increase with an increase in the load. By properly designing the various constants of the system, this increase in voltage can be made to compensate for the additional voltage drops due to the increase in current through the system, and thus maintain the voltage at the load terminals 25 and 26 substantially constant.

Figure 4:
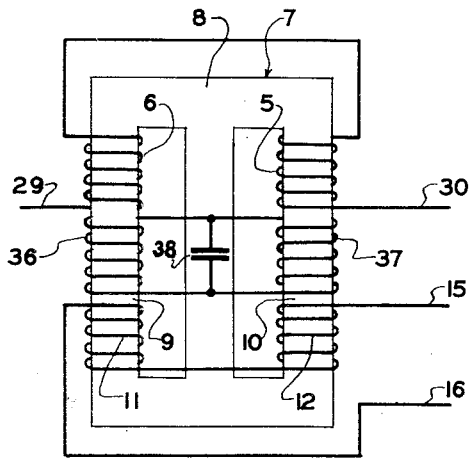
Fig. 4 is a diagrammatic representation of another form of saturating reactor which may be used in my voltage regulating system.

I have found that if a condenser is coupled across the alternating current coils 5 and 6 of the saturating reactor 7, the desired voltage regulation can be accomplished with a considerably smaller amount of material than in the absence of such condensers. Furthermore, the characteristic curve which is obtained with such an arrangement is more nearly ideal than has heretofore been produced. Coupling the condenser across these alternating current coils may be accomplished in a number of ways; for example, these condensers may be connected directly across the alternating current coils. Also these condensers may be inductively coupled to alternating current coils, for example by being connected across the direct current coils. In Fig. 1 I have shown such condensers 34 and 35 connected across the two direct current coils 11 and 12, respectively. Instead of using direct current coils 11 and 12 to couple the condensers across the alternating current coils 5 and 6, they may be coupled across said alternating current coils by additional windings inductively associated therewith. In Fig. 4 I have shown legs 9 and 10 of core 8 provided with additional coils 36 and 37 inductively associated with coils 6 and 5, respectively. Across the coils 36 and 37 is connected a condenser 38. By having a step-up relationship between the coils 6 and 36 and 5 and 37, respectively, a much smaller-sized condenser can be used to obtain the required effect. In the claims I use the term "connected in parallel" in connection with these condensers to indicate that they are associated with the alternating current coils, either by being connected directly across said coils or by being inductively associated with said coils.

Figure 2:
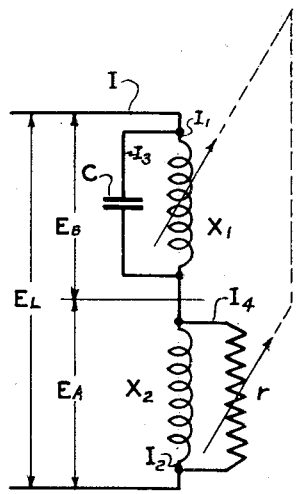
Fig. 2 is a diagrammatic equivalent circuit of the arrangement shown in Fig. 1.

The operation which is secured as a result of the presence of these condensers 34 and 35 in Fig. 1 or the condenser 38 in Fig. 4 may be better understood by referring to Fig. 2 in which the equivalent circuit of the arrangement as shown in Fig. 1 is illustrated. In this figure $X_1$ represents the effective impedance of coils 5 and 6; $X_2$ represents the effective impedance of the transformer and its associated circuit as referred to the primary thereof. The effective resistance of the circuit connected across the secondary of the transformer as referred to the primary thereof is represented by $r$. For all practical purposes $r$ may be considered the resistance of the load as referred to the primary circuit of the transformer. The effective capacity of condensers 34 and 35 in the equivalent circuit is represented by C. The currents flowing in the various parts of the circuit are represented by $I$, $I_1$, $I_2$, $I_3$ and $I_4$, while the voltages appearing across the various parts of the system are represented by $E_A$, $E_B$ and $E_L$. Since the impedance $X_1$ varies with variations in the load, and since $r$ likewise varies with variations in the load, this fact has been represented by the arrows through $X_1$ and $r$, respectively. The fact that both of these quantities vary with the load has been represented by the dotted lines connecting the two arrows. At light loads impedance $X_1$ is greatest. Therefore its admittance at that time is smallest. Since $X_1$ and C are in parallel with each other, the admittance of C subtracts itself directly from the admittance of $X_1$. Therefore the total admittance of the parallel circuit $X_1C$ is least at no load. Since the impedance of said parallel circuit is the reciprocal of the admittance, it will be seen that the effective impedance thereof is greatest at no load. The total voltage $E_L$ will divide between the voltages $E_B$ and $E_A$ in accordance with the effective impedance of the respective circuits across $E_A$ and $E_B$. Since the effect of adding condenser C to the system is to increase the effective impedance of the circuit across $E_B$, the presence of said condenser will therefore decrease the voltage $E_A$. As the load increases, however, the impedance $X_1$ decreases, and therefore its admittance increases. C, however, remains constant, and its admittance therefore remains constant. As the admittance of $X_1$ increases, the admittance of C subtracted therefrom forms a smaller proportion thereof, and thus has a proportionately smaller effect upon the resultant impedance of said parallel circuit. Therefore the effective impedance of said parallel circuit is affected proportionately less by the presence of condenser C as the load increases. The increase in load across $X_2$ may be represented by a decrease in the resistance $r$ which produces a resultant decrease in the effective impedance of the parallel circuit $X_2 r$. Since the voltage $E_L$ will subdivide across the impedances $X_1$ and $X_2$ in accordance with the relative values of the effective impedance of the two parallel circuits $X_1 C$ and $X_2 r$, the rise in the voltage $E_A$ with an increase in load will depend upon the fact of whether or not the effective impedance of the parallel circuit $X_1 C$ decreases at a faster rate than does the effective impedance of the parallel circuit $X_2 r$. As has been pointed out above, the presence of the condenser C causes a more rapid variation in the admittance of the circuit $X_1 C$, and therefore the impedance thereof then would occur in the absence of such a condenser. This increase in the rate of variation of the impedance of circuit $X_1 C$ therefore produces to a more effective degree the desired regulation of the system.

Figure 3:
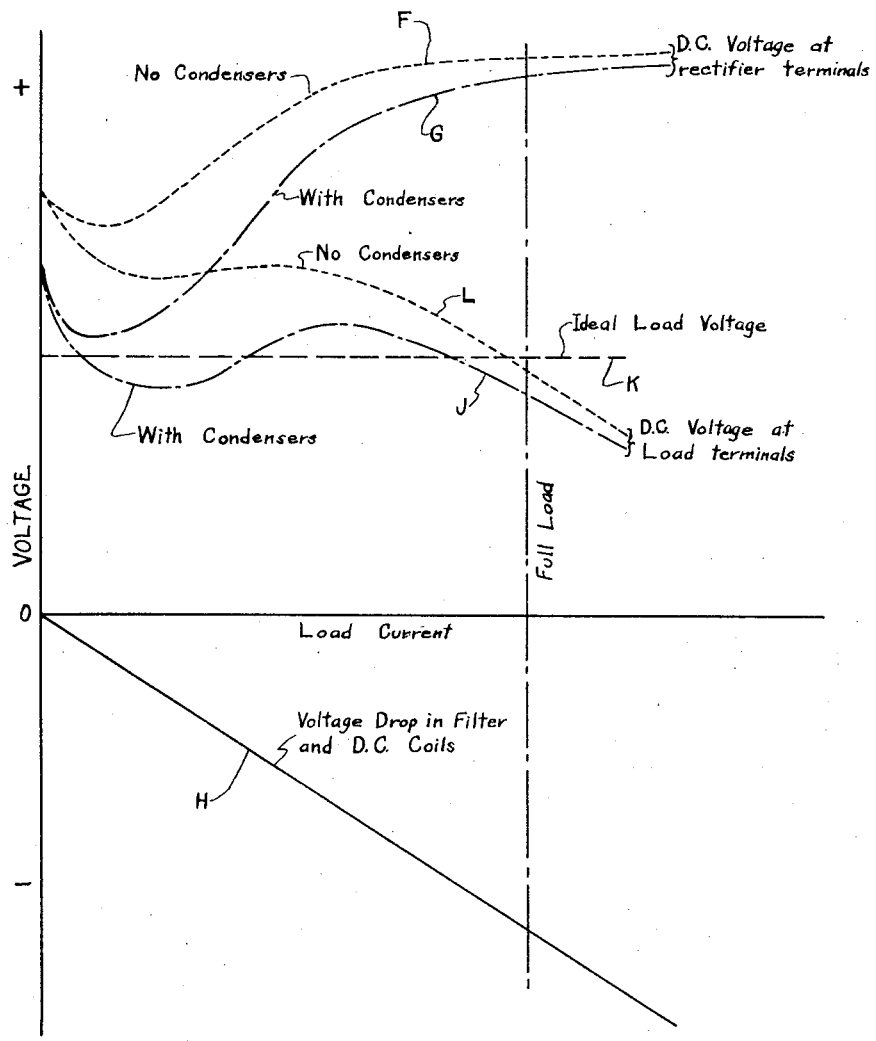
Fig. 3 is a set of diagrammatic curves explaining the operation of the arrangement as shown in Fig. 1.

The above effect may be more clearly illustrated by referring to Fig. 3. In this figure the horizontal axis represents the load current while the vertical axis represents voltage, the region above the horizontal axis representing positive voltage and the region below, negative voltage or voltage drop. In Fig. 3 curve F represents the direct current voltage which occurs at the rectifier terminals with such an arrangement as illustrated in Fig. 1 without condensers. Curve G represents this characteristic curve with condensers. It will be seen that the presence of condensers causes the voltage impressed on the rectifier and therefore the voltage which appears at its output terminals to be much smaller at low loads than if no such condensers are present. However, since the condenser has less and less effect as the load increases, the distance between the characteristic curves G and F decreases as the load increases. The total effect, therefore, is to have a greater compounding action in the case of curve G than in the case of curve F. Therefore, if a system is used in which the voltage drop in the filter and the direct current coils is that represented by curve H, the resultant voltage curve with the presence of condensers is that represented by curve J. It will be seen that this curve J approximates the ideal voltage curve K. If, however, no condensers are used, the resultant characteristic curve of the system may be represented by curve L. It will be seen that this curve, instead of remaining substantially constant or varying about a constant value, falls steadily from no load to full load, and therefore the desired maintenance of the voltage at the load terminals is not accomplished.

The desired compounding effect which is reached by the presence of condensers is partially due to an additional phenomena which follows from their use. I have found that if no condensers are used, the alternating voltage which appears at the output of the transformer 2 is not a pure sine wave, but is a distorted wave which is flattened out at the top at low loads but becomes more and more peaked as the load increases. Therefore the ratio between the effective and the average value of the alternating voltage curve increases. This ratio is the form factor. The value of the alternating voltage measured by a meter is the effective value while the amount of direct current voltage which occurs upon rectification is dependent upon the average value. Therefore if a system is constructed so that the alternating voltage at the output of the transformer appears to rise at a sufficiently rapid rate to produce the desired regulation, it will be found that this regulation is not actually secured because an increasingly smaller proportion of the alternating voltage is available as an average D. C. value. In other words, much of the apparent compounding of the system is lost due to the change in wave shape. I have found, however, that by the use of condensers, the voltage applied to the rectifier at no load may have a somewhat peaked shape which becomes flatter as the load increases. As the load increases beyond a certain point, however, the wave again becomes peaked. By proper selection of the value of condensers, the flattest wave can be made to occur at any desired load. Instead, therefore, of the form factor increasing, the use of condensers causes the form factor to decrease. Therefore, in addition to the apparent compounding of the alternating voltage impressed upon the rectifier, there is an increase in the direct voltage compounding due to the flattening out of the wave shape supplied to the rectifier. This is an additional reason why the curve G in Fig. 3 rises more rapidly than does the curve F.

My invention as herein exemplified produces additional advantages which are secured either with or without the use of the condensers, as explained above. These additional advantages are secured from the arrangement of the coils in the saturating reactor 7, as exemplified in Figs. 1 and 4.

Coils 6 and 11 and 5 and 12 are inductively coupled with each other, and therefore the alternating current flowing through coils 5 and 6 tends to induce alternating voltages in coils 11 and 12, respectively. These coils, however, are so associated that the alternating voltage induced in coil 11 by coil 6 is substantially equal and opposite to the alternating voltage induced in coil 12 by coil 5. The two coils 5 and 6 tend to set up alternating fluxes in the two outer legs 9 and 10. These two fluxes may be set up in the same direction around the core 7 so that substantially none of said fluxes tends to pass through the central leg 8'. In this case the direct flux set up by the coils 11 and 12 will be in opposite directions in the two legs 9 and 10, so that this direct flux passes through the central leg 8'. Instead of this arrangement, however, the fluxes can be so related that the alternating flux passes through the central leg 8' and the direct flux is set up in the same direction around the core 7, so that it does not pass through the central leg 8'. Due to the exclusion of one of the fluxes through the central leg 8', the effectiveness of the control by the direct flux and the complete elimination of induced alternating voltages in the coils 11 and 12 are enhanced. The arrangement of coils 5 and 6 in Fig. 1 in parallel produces under these conditions a very decided increase in the effectiveness of the system. Since these coils are in parallel, the alternating voltage which occurs across any one of these coils is exactly the same as the alternating voltage appearing across the other of said coils. Also any transient voltage which is induced in one coil appears across the terminals thereof and is impressed across the terminals of the other of said coils. These alternating and transient voltages appearing in coils 5 and 6 induce like voltages in coils 11 and 12.

Since the applied voltages in coils 5 and 6 are always equal, the induced voltages in coils 11 and 12 likewise will always be equal, and since they are opposite in direction, said voltages will be balanced out in the direct current circuit of which coils 11 and 12 are a part.

In addition to the above effect, another advantageous effect is produced. Any surge in current which tends to occur through coils 11 and 12 will induce voltages in coils 6 and 5. As will be seen, coils 5 and 6 being in parallel form a local closed circuit with each other. The voltages induced in these two coils, due to surges in coils 11 and 12, are in the same direction through said closed circuit, and therefore coils 5 and 6 form a local short-circuited circuit for all transient or alternating variations in coils 11 and 12. This arrangement, therefore, short-circuits coils 11 and 12 in so far as any transient or alternating variations through them are concerned. Therefore, the alternating current inductance of coils 11 and 12 is substantially eliminated. The only alternating current inductance which these coils possess is that which is due to the leakage flux around them. In order to make this leakage flux as small as possible, I have wound coil 11 on the same leg as coil 6, and coil 12 on the same leg as coil 5. These coils being thus closely coupled substantially eliminate all leakage flux around coils 11 and 12, and therefore their alternating current impedance is substantially zero.

The arrangement, as shown in Fig. 4, enables the coils 5 and 6 to be connected in series instead of in parallel, and still obtain to some degree the advantages secured from the parallel connection of coils 5 and 6, as shown in Fig. 1. The coils 36 and 37 are connected in parallel, and are wound in such a direction that the alternating voltage induced in coil 36 by coil 6 is substantially equal and opposite to the alternating voltage induced in coil 37 by coil 5. Since these induced voltages are in opposite directions around the closed circuit formed by the coils 36 and 37, substantially no circulating alternating current will flow through said closed circuit due to alternating voltages induced by coils 5 and 6. As in Fig. 1, coils 11 and 12 are connected so that the voltages induced in these two coils by the coils 5 and 6 are substantially equal and opposite in direction so that no resultant alternating current is induced in the direct current circuit. Due to the fact that coils 36 and 37 are connected in parallel with each other, as shown in Fig. 4, the voltage which appears across the terminals of one of these coils is the same as the voltage which appears across the other of said coils. Since these coils are closely coupled to the coils 5 and 6, there is a tendency for the voltages between the coils 5 and 6 likewise to be balanced and substantially equal to each other. The same balancing effect is likewise produced in coils 11 and 12 so that the alternating voltage is more perfectly balanced out in the direct current circuit. The coils 36 and 37 moreover present a short-circuited circuit to any transient voltages which occur in coils 11 and 12 in the same manner as do the parallel connected coils 5 and 6 of Fig. 1. Therefore the arrangement in Fig. 4 likewise substantially eliminates the alternating current impedance of coils 11 and 12. Since leakage flux is likewise substantially eliminated in the arrangement as shown in Fig. 4, the alternating current impedance of coils 11 and 12 is substantially zero.

The mounting of the four coils 5, 6, 11 and 12 on the two outer legs of the core 8, as shown in Figs. 1 and 4, produces another important effect. Previously, arrangements have been devised in which the direct current saturating coil was placed upon the central leg of such a three-legged choke while two alternating current coils were placed upon the two outer legs, or vice versa. Since it is the function of the direct current saturating coil to saturate the magnetic path through the alternating current coils, such an arrangement had several drawbacks. Since the direct current magneto-motive force was applied to a separate part of the magnetic circuit from the alternating magneto-motive force, it was difficult to transfer the action of the direct current saturating coil to that part of the core upon which the alternating current coil was wound. This was due to the fact that leakage flux occurred around the direct current coil, and this leakage flux was wasted in so far as saturation of the path through the alternating current coil was concerned. Also the presence of this leakage flux introduced an alternating current reactance into the direct current coil, and thus produced the defect as explained above. In my present arrangement, since the direct current coils and the alternating current coils are wound upon the same legs, the direct magneto-motive force and the alternating magneto-motive force are applied to the magnetic path at the same place, and therefore the saturation produced by the direct current coils occurs at the desired place, namely, in the magnetic path through the alternating current coils.

Aside from the advantages secured by mounting the coils on the two outer legs and leaving the middle leg of the reactor core bare, there is secured certain mechanical and manufacturing advantages. By such an arrangement less space is taken up by the insulation of the various coils, and thus there is more space for wire and iron. Therefore the reactor can be made with smaller outside dimensions than with the previous arrangement. Also the coil windings on the two outer legs are substantially identical, and therefore when such devices are manufactured in quantity, but one coil design need be made, thus greatly reducing the expense of manufacture. Furthermore, the arrangement as shown is much simpler to assemble.

Of course it is to be understood that this invention is not limited to the particular details of the arrangements as described, as many equivalents will suggest themselves to those skilled in the art. It is accordingly desired that the appended claims be given a broad interpretation commensurate with the scope of the invention within the art.

What is claimed is:

1. A regulating system comprising a rectifier adapted to be fed from a source of alternating current through an alternating current circuit, a regulating reactor in said alternating current circuit, said regulating reactor comprising a saturable magnetic core, a saturating winding on said core, said saturating winding being energized in accordance with the direct current output of said rectifier, and an alternating current winding on said core inductively related to said saturating winding and connected in a closed circuit of substantially zero resistance, said alternating current winding being so related to said alternating current circuit that simultaneous alternating voltages are set up in said winding equal and opposite to each other around said closed circuit, said alternating current winding being so related to said saturating winding that variations of current in said saturating winding induce voltages in said alternating current winding in the same direction around said closed circuit.

2. A regulating system comprising a rectifier adapted to be fed from a source of alternating current through an alternating current circuit, a regulating reactor in said alternating current circuit, said regulating reactor comprising a saturable magnetic core, a saturating winding on said core, said saturating winding being energized in accordance with the direct current output of said rectifier, and a pair of alternating current coils on said core inductively related to said saturating winding and connected across each other in a closed circuit of substantially zero resistance, said alternating current coils being so related to said alternating current circuit that simultaneous alternating voltages are set up in them equal and opposite to each other around said closed circuit, said coils being so related to said saturating winding that variations of current in said saturating winding induce voltages in said coils in the same direction around said closed circuit.

3. A regulating system comprising a rectifier and direct current output circuit adapted to be fed from a source of alternating current through an alternating current circuit, a regulating reactor in said alternating current circuit, a substantially constant impedance in series with said regulating reactor, means for effectively connecting said rectifier and direct current output circuit across said impedance, said regulating reactor comprising a saturable magnetic core, a saturating winding on said core, said saturating winding being energized in accordance with the direct current output of said rectifier, and an alternating current winding in said alternating current circuit, said alternating current winding comprising a pair of coils wound on different legs of said core, said coils being connected in parallel with each other, and so related to said saturating winding that each coil induces an alternating voltage in said saturating winding which is equal and opposite to the voltage induced in said saturating winding by the other of said coils.

4. A regulating system comprising a rectifier adapted to be fed from a source of alternating current through an alternating current circuit, a regulating reactor in said alternating current circuit, said regulating reactor comprising a saturable magnetic core having a plurality of legs, a saturating winding on said core, said saturating winding comprising a pair of direct current coils in series in the direct current output circuit of said rectifier, each of said direct current coils being wound on a different leg of said core, and an alternating current winding in said alternating current circuit, said alternating current winding comprising a pair of alternating current coils, said two alternating current coils being wound on the two legs of said core having the direct current coils, said alternating current coils being connected in parallel with each other, and so related to said direct current coils that each alternating current coil induces an alternating voltage in one of said direct current coils which is equal and opposite to the voltage induced in the other of said direct current coils by the other of said alternating current coils.

5. A regulating system comprising a rectifier adapted to be fed from a source of alternating current through an alternating current circuit, a regulating reactor in said alternating current circuit, said regulating reactor comprising a saturable magnetic core, said core having three legs, a saturating winding on said core, said saturating winding comprising a pair of direct current coils in the direct current output circuit of said rectifier, said direct current coils being wound on the two outer legs of said core, and an alternating current winding in said alternating current circuit, said alternating current winding comprising a pair of alternating current coils, said two alternating current coils also being wound on the two outer legs of said core and so related to said direct current coils that each alternating current coil induces an alternating voltage in one of said direct current coils which is simultaneous, equal and opposite to the voltage induced in the other of said direct current coils by the other of said alternating current coils.

6. A regulating system comprising a rectifier adapted to be fed from a source of alternating current through an alternating current circuit, a regulating reactor in said alternating current circuit, said regulating reactor comprising a saturable magnetic core, said core having three legs, a saturating winding on said core, said saturating winding comprising a pair of direct current coils in series in the direct current output circuit of said rectifier, said direct current coils being wound on the two outer legs of said core, and an alternating current winding in said alternating current circuit, said alternating current winding comprising a pair of alternating current coils, said two alternating current coils also being wound on the two outer legs of said core, said alternating current coils being connected in parallel with each other, and so related to said direct current coils that each alternating coil induces an alternating voltage in one of said direct current coils which is equal and opposite to the voltage induced in the other of said direct current coils by the other of said alternating current coils.

7. A regulating system having a predetermined full load direct current output rating and comprising a rectifier adapted to be fed from a source of alternating current through an alternating current circuit, means for imparting to said system a rising voltage characteristic comprising means in said alternating current circuit energized in accordance with the direct current output of said rectifier for decreasing the form factor of the alternating voltage applied to said rectifier as said direct current output increases throughout substantially the entire load range up to substantially said full load rating.

8. A regulating system having a predetermined full load direct current output rating and comprising a rectifier adapted to be fed from a source of alternating current through an alternating current circuit, a regulating reactor in said alternating current circuit, said regulating reactor comprising a saturable magnetic core, a saturating winding on said core, said saturating winding being energized in accordance with the direct current output of said rectifier, an alternating current winding in said alternating current circuit, said alternating current winding being wound on said core and inductively related to said saturating winding, and capacity means in parallel with said alternating current winding, said capacity means being of a value to decrease the form factor of the alternating voltage applied to said rectifier as said direct current output increases throughout substantially the entire load range up to substantially said full load rating.

9. A regulating system comprising a rectifier adapted to be fed from a source of alternating current through an alternating current circuit, a regulating reactor in said alternating current circuit, said regulating reactor comprising a saturable magnetic core, a saturating winding on said core, said saturating winding being energized in accordance with the direct current output of said rectifier, an alternating current winding in said alternating current circuit, said alternating current winding being wound on said core and inductively related to said saturating winding, and capacity means connected across a winding inductively associated with said alternating current winding, said capacity means being of a value to decrease the form factor of the alternating voltage applied to said rectifier as said direct current output increases.

10. A regulating system comprising a rectifier adapted to be fed from a source of alternating current through an alternating current circuit, a regulating reactor in said alternating current circuit, said regulating reactor comprising a saturable magnetic core, a saturating winding on said core, said saturating winding being energized in accordance with the direct current output of said rectifier, an alternating current winding in said alternating current circuit, said alternating current winding being wound on said core and inductively related to said saturating winding, an additional winding on said core inductively related to said alternating current winding, and capacity means connected across said additional winding, said capacity means being of a value to decrease the form factor of the alternating voltage applied to said rectifier as said direct current output increases.

11. A regulating system comprising an alternating current circuit, and a control circuit adapted to produce a current having a substantial direct current component, a regulating reactor in said alternating current circuit, said regulating reactor comprising a saturable magnetic core, a saturating winding on said core, said saturating winding adapted to be energized by said control circuit, and a closed circuit of substantially zero resistance coupled to said saturating winding, said closed circuit being so related to said saturating winding that variations of current in said saturating winding set up voltages in said closed circuit in the same direction around said closed circuit.

12. A regulating system comprising an alternating current circuit and a control circuit adapted to produce current having a substantial direct current component, a regulating reactor in said alternating current circuit, said regulating reactor comprising a saturable magnetic core having a plurality of legs, a saturating winding on said core, said saturating winding adapted to be energized from said control circuit and comprising a pair of coils, each of said coils being wound on a different leg of said core, an alternating current winding on said core, said alternating current winding comprising a pair of coils, said two alternating current coils being wound on the two legs of said core having said saturating windings, said alternating current coils being so related to said saturating windings that each alternating current coil induces an alternating voltage in one of said saturating coils which is equal and opposite to the voltage induced in the other of said saturating coils by the other of said alternating current coils.

13. A regulating system comprising an alternating current circuit and a control circuit adapted to produce a current having a substantial direct current component, a regulating reactor in said alternating current circuit, said regulating reactor comprising a saturable magnetic core and a saturating winding on said core, said saturating winding being adapted to be energized by said control circuit, and a condenser coupled to said reactor, said condenser being of a value to increase the effective impedance of said reactor.

FREDERICK S. DELLENBAUGH, Jr.